(12) United States Patent
Wong

(10) Patent No.: US 10,537,812 B2
(45) Date of Patent: *Jan. 21, 2020

(54) SYSTEMS AND METHODS FOR INTERACTIVE COMMUNICATION BETWEEN AN OBJECT AND A SMART DEVICE

(71) Applicant: Future of Play Global Limited, Tsim Sha Tsui, Kowloon (HK)

(72) Inventor: To Sun Wong, Kowloon (HK)

(73) Assignee: Future of Play Global Limited, Hong Kong (HK)

( * ) Notice: Subject to any disclaimer, the term of this patent is extended or adjusted under 35 U.S.C. 154(b) by 0 days.

This patent is subject to a terminal disclaimer.

(21) Appl. No.: 15/940,436

(22) Filed: Mar. 29, 2018

(65) Prior Publication Data

US 2018/0280810 A1 Oct. 4, 2018

Related U.S. Application Data

(63) Continuation of application No. 15/006,408, filed on Jan. 26, 2016, now Pat. No. 9,931,572, which is a continuation-in-part of application No. 14/486,905, filed on Sep. 15, 2014, now abandoned.

(51) Int. Cl.
| | | |
|---|---|---|
| A63F 13/24 | (2014.01) | |
| A63F 13/814 | (2014.01) | |
| A63F 13/215 | (2014.01) | |
| A63F 13/213 | (2014.01) | |
| A63H 30/04 | (2006.01) | |

(52) U.S. Cl.
CPC .......... *A63F 13/814* (2014.09); *A63F 13/213* (2014.09); *A63F 13/215* (2014.09); *A63H 30/04* (2013.01); *A63H 2200/00* (2013.01)

(58) Field of Classification Search
CPC ..... A63F 13/213; A63F 13/215; A63F 13/814
See application file for complete search history.

(56) References Cited

U.S. PATENT DOCUMENTS

| | | | | |
|---|---|---|---|---|
| 8,577,520 | B1 * | 11/2013 | Wong ..................... | A63H 27/12 244/17.13 |
| 9,855,512 | B1 * | 1/2018 | Wong ..................... | A63H 27/12 |
| 2013/0130587 | A1 * | 5/2013 | Cohen .................... | A63H 30/04 446/175 |
| 2014/0206253 | A1 * | 7/2014 | Huyck ................... | A63H 30/04 446/175 |
| 2014/0256214 | A1 * | 9/2014 | Ramamoorthy ......... | A63H 3/28 446/297 |

* cited by examiner

*Primary Examiner* — Omkar A Deodhar
*Assistant Examiner* — Shauna-Kay Hall
(74) *Attorney, Agent, or Firm* — Raymond Sun

(57) ABSTRACT

Methods for interactive communication between an object and a smart device are provided. Signals can be transmitted from the smart device to the object to control movement of a movable part at the object. Signals can also be transmitted from the smart device to the object to broadcast words and/or songs at a speaker at the object. In addition, in response to a user's touching the object, the object's speaker can broadcast words and/or songs. The signals transmitted from the smart device to the object transceiver can be audio signals so as to create a two-way interactive and live communication. In addition, voice instructions can be spoken into the microphone of the object, and then transmitted from the object to the smart device to initiate an activity at the smart device.

4 Claims, 15 Drawing Sheets

SYSTEMS AND METHODS FOR INTERACTIVE COMMUNICATION BETWEEN AN OBJECT AND A SMART DEVICE

BACKGROUND OF THE INVENTION

1. Field of the Invention

The present invention relates to interactive play involving an object, and in particular, to systems and methods for interactive communication between an object and a smart device.

2. Description of the Prior Art

Interactive toys have become increasingly popular in recent times. Children enjoy playing with toys that communicate with or respond to different actions or instructions issued by the user. For example, children like to interact with a doll or action figure that can respond and interact with the child.

In addition, smart devices such as smart phones and tablets have also become so prevalent that almost every adult (and many teenagers and older children) also own or use at least one or more of these smart devices, both at home and in public.

There remains a need for facilitating interactive activity between a smart device and an object, such as a toy, action figure, doll or other object.

SUMMARY OF THE DISCLOSURE

It is an object of the present invention to provide methods and systems for facilitating the interaction between a smart device and an object, such as a toy, doll, action figure, or other object.

In order to accomplish the objects of the present invention, there is provided methods for interactive communication (either one-way, or two-ways) between an object and a smart device.

In one embodiment, signals can be transmitted from the smart device to the object to control movement of a movable part at the object. Signals can also be transmitted from the smart device to the object to broadcast words and/or songs at a speaker at the object. In addition, in response to a user's touching the object, the object's speaker can broadcast words and/or songs. The signals transmitted from the smart device to the object transceiver can be audio signals so as to create a two-way interactive and live communication.

In accordance with another embodiment, voice instructions can be spoken into the microphone of the object, and then transmitted from the object to the smart device to initiate an activity at the smart device. The activity can be the broadcast of the voice instructions at the speaker of the smart device, or the broadcast of a story or music at the speaker of the smart device.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

The present invention provides an object (such as a toy) which is capable of moving and producing sounds in response to prompts, messages, instructions or other similar inputs received by the object from a smart device or other input means. The movements and sounds produced by the object are in direct response to (or relate to) the inputs received by the object. The object can also provide instructions or responses directly to the smart device, which can take the form of messages, or instructions to activate an app or program on the smart device. The communication between the smart device and the object can be effectuated through a Wi-Fi connection, or through Bluetooth™ connection. It is an object of the present invention to facilitate communication between the object and the smart device that resembles a real-life communication and interaction between two living creatures.

The Object

Figure 1:
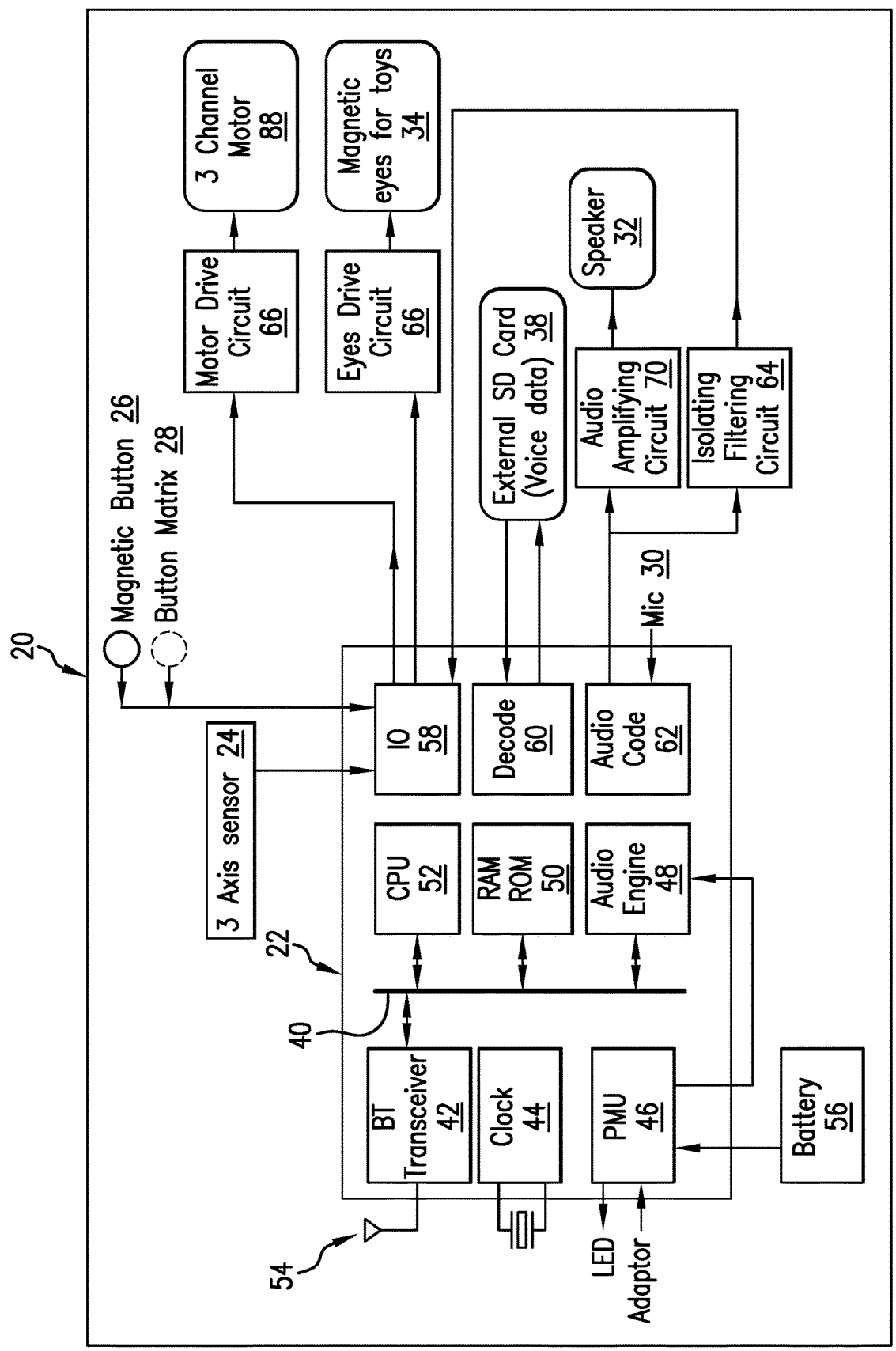
FIG. 1 is a block diagram illustrating one system according to the present invention.

FIG. 1 illustrates an object 20 according to the present invention. The object 20 can be a doll, action figure, toy or any object which is configured and intended to have an interactive activity with a human being. The object 20 has a communication module 22 that interfaces with input devices and output devices that are coupled to the object 20.

Specifically, the input devices include three-axis sensor 24, a magnetic button 26, a matrix of buttons 28, and a microphone 30. The three-axis sensor 24 can be a conventional gyroscope or accelerator, and if the object 20 is a doll or action figure, can be positioned in the body of the action figure for allowing the object 20 to be used as a steering wheel or controller. If the object 20 is a doll or action figure, the magnetic button 26 can be positioned on the hands for allowing the user to select functions. The matrix of buttons 28 can be positioned anywhere on the object 20, and if the object 20 is a doll or action figure, the buttons 28 can be positioned on the palm of a hand for a more natural interaction (i.e., actuating the buttons 28 while holding the hands of the doll or action figure), or on the body. The buttons 28 function to allow the user to select from a number of instructions or operations, such as on/off, changing modes, playing music, selecting a story to be told, etc. The microphone 30 inputs sounds from external sources for processing by the communication module 22.

The output devices include a speaker 32, one or more magnetic eyes 34 (if the object 20 is a toy, doll or action figure), and a three-channel motor 88 which is adapted to control the movements of parts of the object 20. For example, the motor 88 can be used to control the limbs or the head of a doll or action figure. In addition, an external sound data card 38 can be coupled to a decode module 60 in the communication module 22 to provide, and to receive, sound data.

The communication module 22 includes the following components or circuits that are coupled to a bus 40: a transceiver 42, a clock 44, a PMU (power management unit) 46, an audio engine 48, a RAM/ROM 50, and a CPU 52. An antenna 54 is coupled to the transceiver 42 for receiving and transmitting data. An LED and an adaptor are coupled to the PMU 46. The LED provides indication lights, and the adaptor is used for coupling a power supply, and for uploading or downloading data via a USB cable. A power source 56 (e.g., a battery) is coupled to the PMU 46 to provide power to the PMU 46. Also, the PMU 46 provides power to the audio engine 48 for sound processing converting the voice signal to data, or converting data to a voice signal).

The communication module 22 also includes an IO (input-output) module 58, a decode module 60, and an audio code module 62. The IO module 58 receives inputs from the three-axis sensor 24, the buttons 26, 28, and an output from an isolating filter circuit 64. The IO module 58 provides outputs to a motor drive circuit 66 that controls the three-channel motor 88, and also to an eyes drive circuit 68 that controls the magnetic eye(s) 34. The decode module 60 decodes voice data from the external sound card 38. The audio code module 62 receives inputs from the microphone 30, and provides an output that is provided to the isolating filtering circuit 64 and an audio amplifying circuit 70.

Figure 2:
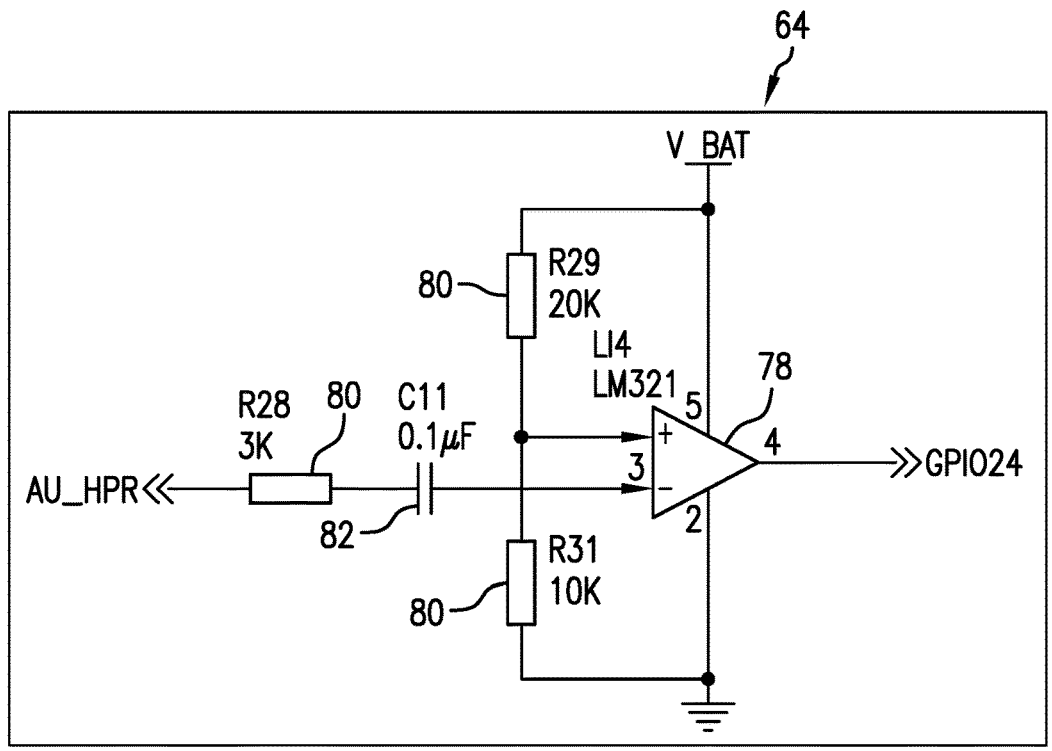
FIG. 2 is a circuit diagram for the isolating filtering circuit shown in FIG. 1.

The isolating filtering circuit 64 is shown in detail in FIG. 2. When the isolating filter circuit 64 receives the audio current from the audio code 62, the resistors 80 will limit the flow rate and reduce the voltage of audio current, which is then provided through a capacitor 82 for coupling, and then to a comparator 78 which compares the input signal "3" (which is the voltage of the audio current) and the input signal "1" (which is a reference voltage) to determine if the input signal is a high level or low level (e.g., 5 kHz or 1 kHz). The comparator 78 will then output the appropriate electric frequency to the IO module 58.

Figure 3:
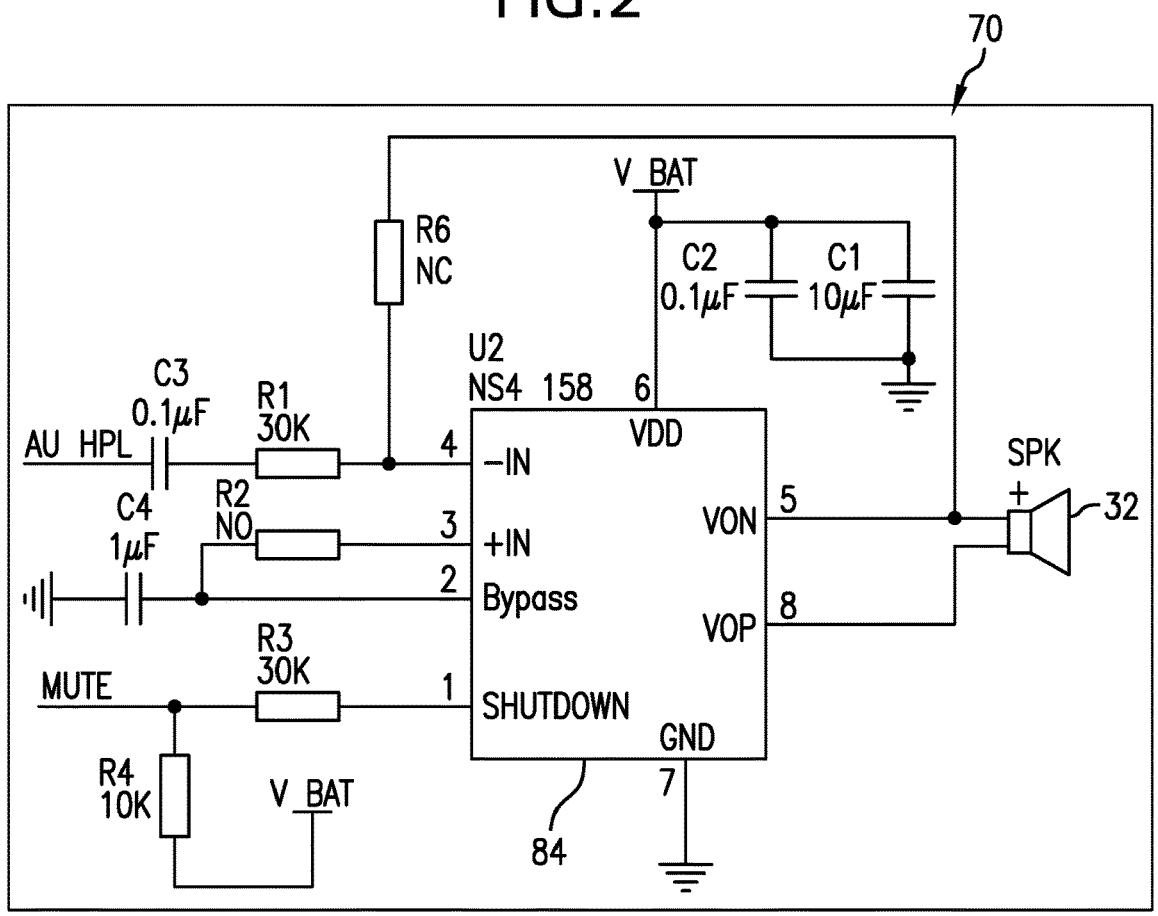
FIG. 3 is a circuit diagram for the audio amplifying circuit shown in FIG. 1.

The audio amplifying circuit 70 is shown in FIG. 3 and functions as a sound amplifier and feeds its output to the speaker 32. The audio amplifying circuit has an integrated circuit (IC) 84 which functions to amplify the sound and then outputs the audio current to the speaker 32.

Figure 4C:
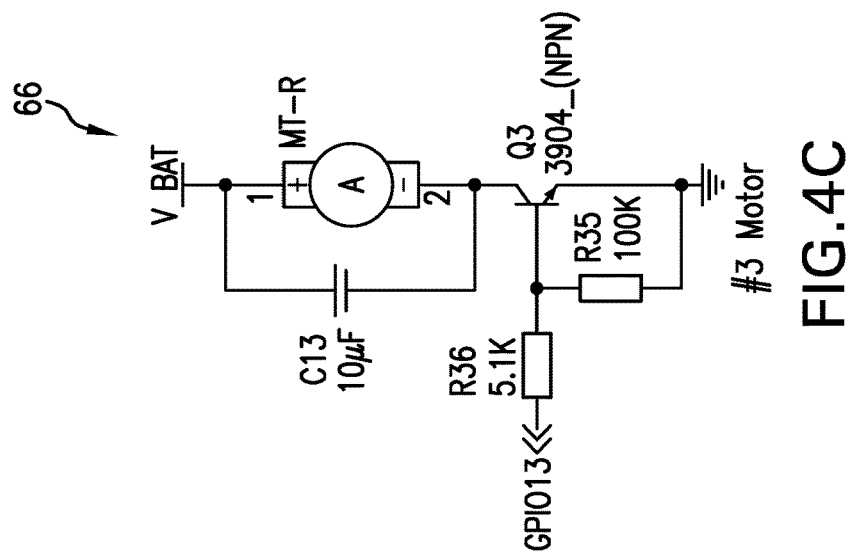
FIGS. 4A-4C are circuit diagrams for the motor drive circuit shown in FIG. 1.
Figure 4B:
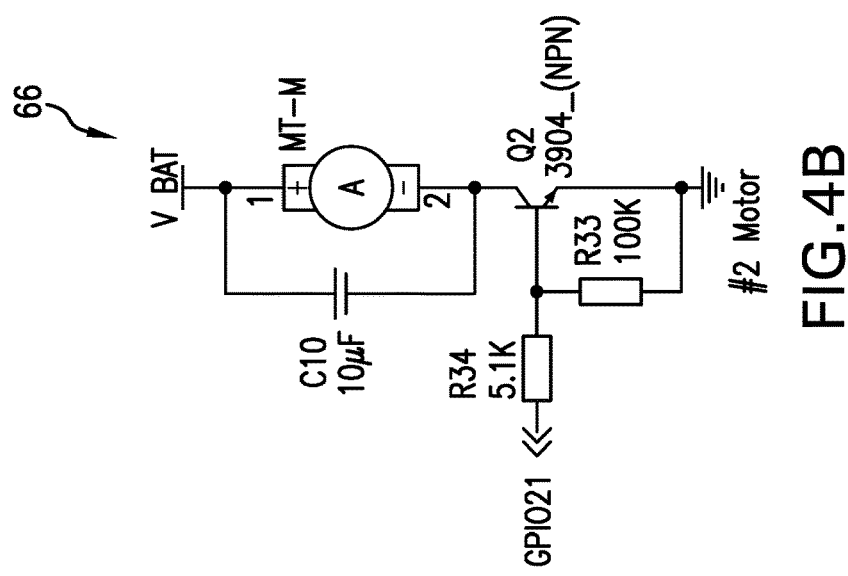
Figure 4A:
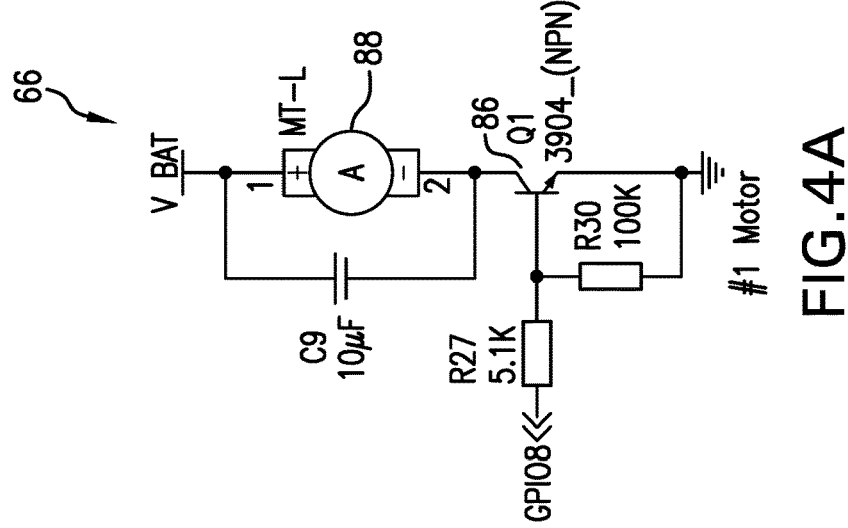

A motor drive circuit 66 controls the three-channel motor 88, and is shown in FIGS. 4A-4O. FIG. 4A shows the circuit that controls the left channel, FIG. 4B shows the circuit that controls the middle channel, and FIG. 4C shows the circuit that controls the right channel. Each circuit has a NPN transistor 86 and a DC motor 88 that are coupled in the arrangement shown in FIGS. 4A-4C with a capacitor and two resistors to filter waves and to reduce the current. When the transistor 86 receives a high level from the IO module 58, the transistor 86 (which functions as an ON/OFF switch) will turn "on" so that the current can be supplied to the DC motor 88.

Figure 5:
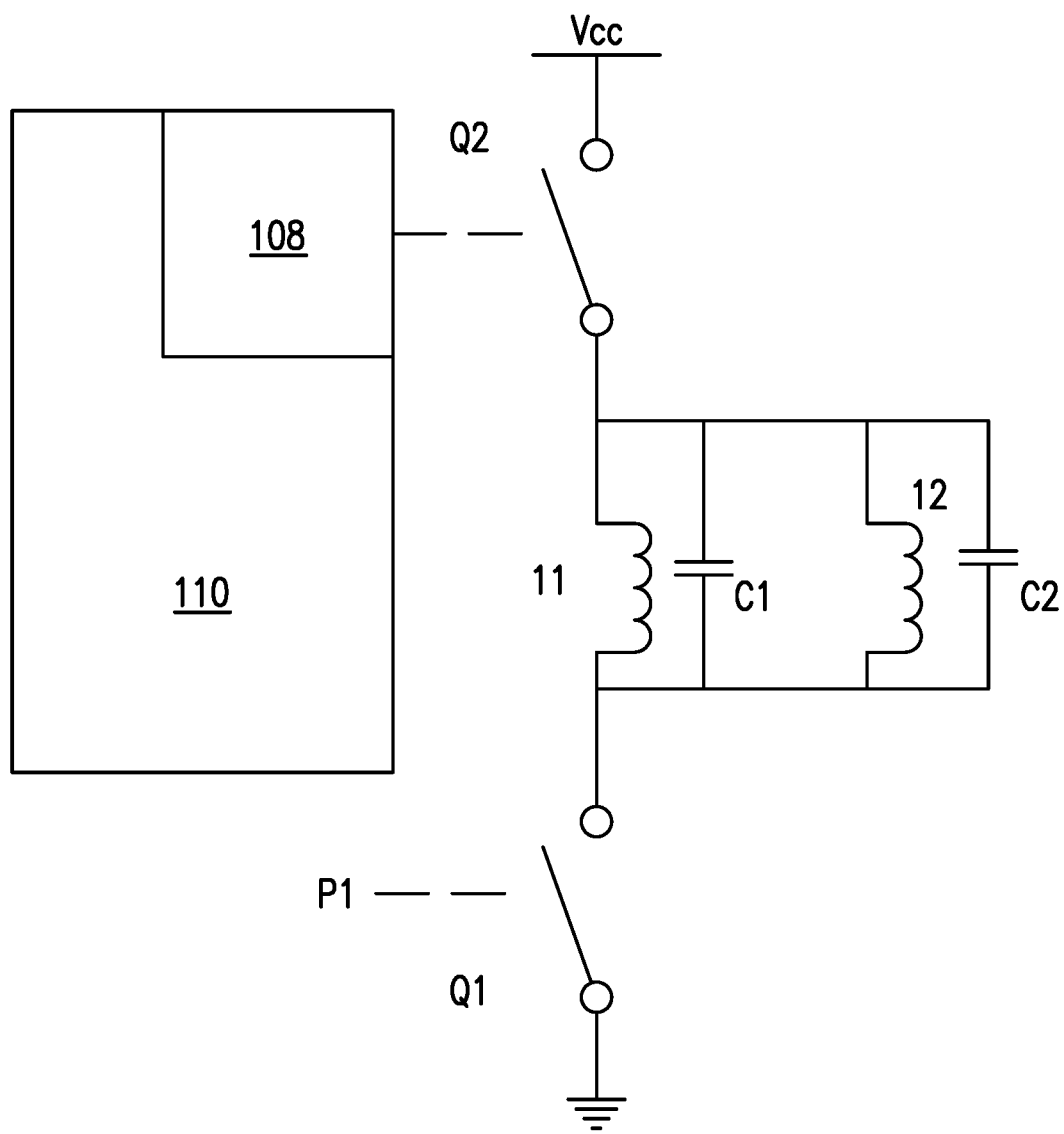
FIG. 5 is a circuit diagram for the eyes drive circuit shown in FIG. 1.

The eyes drive circuit 68 is shown in FIG. 5 and functions to control the movement of an eyeball for a magnetic eye 34. Specifically, the magnetic eye 34 can be caused to pivot up and down through the activation and deactivation of magnetic coils. If the object 20 is an action figure, teddy bear or doll, it can have rotary eyes with spindles provided thereon for pivoting movement. The eyes drive circuit 68 includes a first coil I1, a second coil I2, a processor 110, a first switch Q1 and a second switch Q2. The processor 110 includes a square ware output port 108. A power supply Vcc is grounded through the second switch Q2, the first coil I1 and the first switch Q1. The first coil I1 and the second coil I2 are connected in parallel. The first capacitor C1 and the second capacitor C2 are connected in parallel to the two terminals of the first coil I1. The square wave output port 108 is used for controlling the opening or closing of the second switch Q2. The common terminal of the first inductor L1 and the second inductor L2 is used for controlling the opening or closing of the first switch Q1. When the audio signal is large enough, and when the motor 88 rotates, the P1 terminal outputs a high level, and the first switch Q1 is closed. When the square wave output port 108 outputs a high level, the second switch Q2 is closed; and when the square wave output port 108 outputs a low level, the second switch Q2 is opened, thus the first coil I1 and the second coil I2 are intermittently powered on to generate an intermittent magnetic field.

Bearings matched with spindles are provided on two sides of sockets of the eyes, and the spindles are mounted in the bearings, so that the eyes may rotate around the spindles. The eyes can be provided with magnets. The first coil I1 is disposed on one side of the magnet of one of the eyes. When the first coil I1 is powered on, the generated magnetic field acts on the magnet, so as to generate magnetic attraction (or magnetic repulsion) to the magnet, so that the eyes rotate with the magnet. When the first coil I1 is powered off, the eyes rotate backward, and the square wave output port 108 of a processor 110 outputs square waves, so that the effect of rotating the eyes is accomplished. The second coil I2 is disposed on one side of the other one of the eyes, and it operates using the same principles as the first coil I1. This operation is similar to the devices described in detail in U.S. Pat. No. 6,220,923 to Lin and US2009/0233518 to Hui, whose disclosures are incorporated by this reference as though set forth fully herein.

Bluetooth™ Mode

Figure 6:
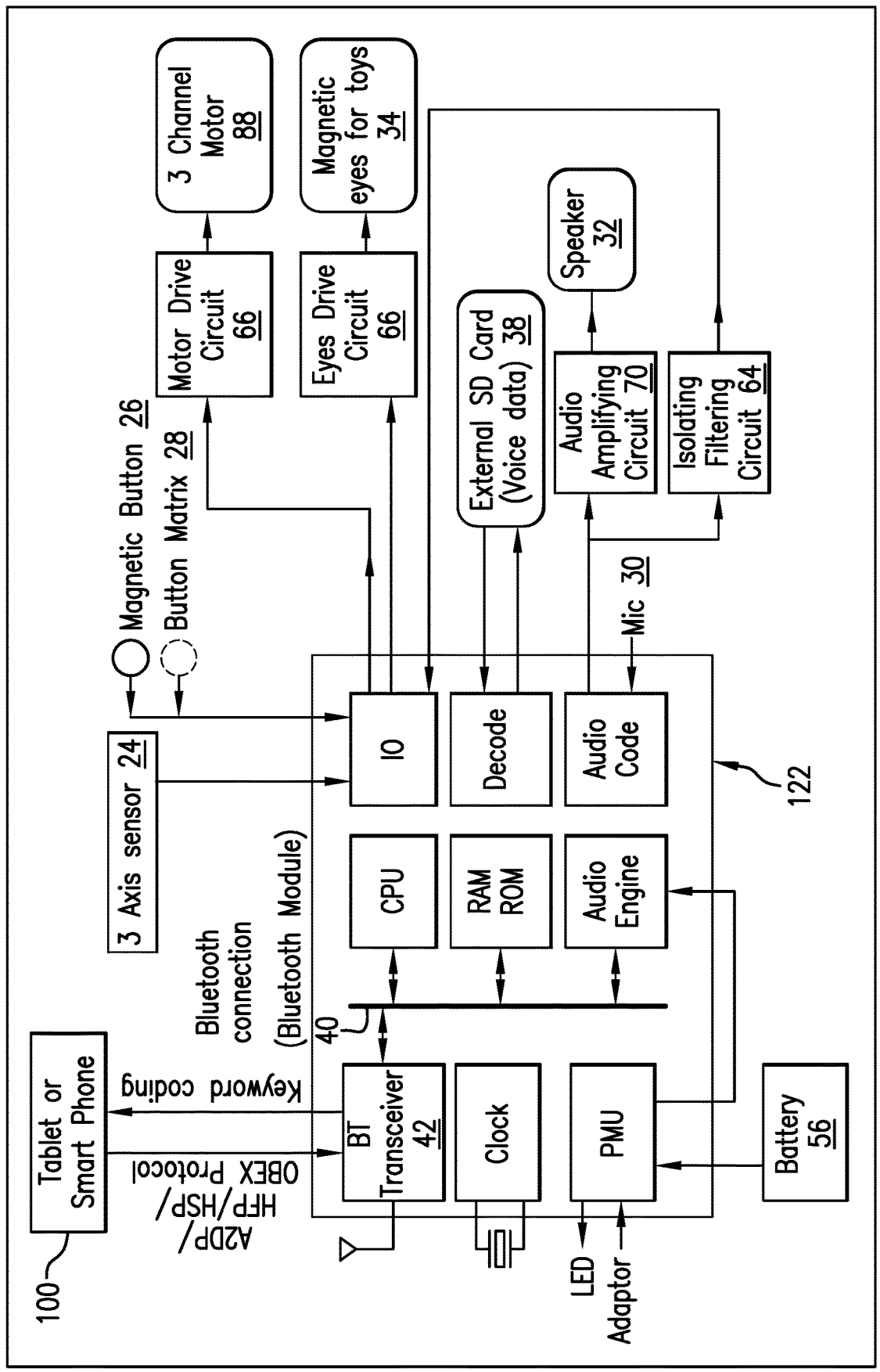
FIG. 6 is a block diagram illustrating another system according to the present invention.
Figure 12:
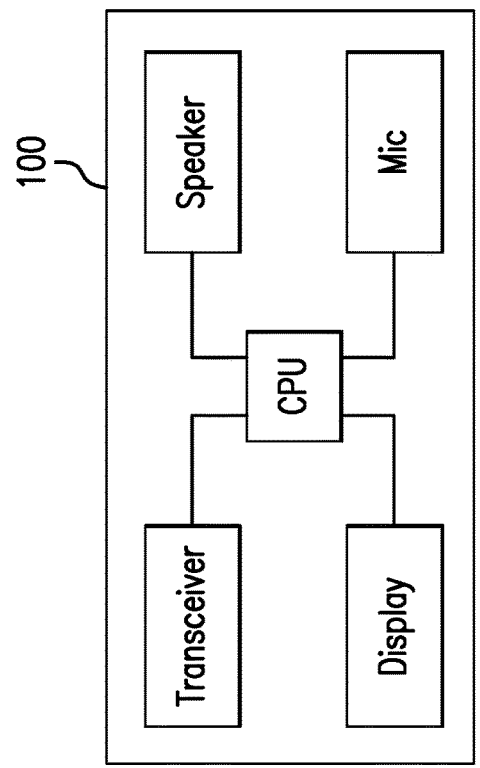
FIG. 12 is a simple schematic diagram illustrating the basic components of the smart device of the present invention.

FIG. 6 illustrates a second embodiment of the present invention where the object 20 shown and described above communicates with a smart device 100 in Bluetooth™ mode. All the components shown in FIG. 6 are identical to the components shown in FIG. 1, except that FIG. 6 now shows the smart device 100 communicating with the transceiver 42 via the Bluetooth™ protocols described below. The communications module 22 is now a Bluetooth™ module 122. The smart device 100 can be a conventional tablet, smartphone, or the like, which has a microphone, a speaker, a display and a transceiver that transmits and receives audio, video and data signals. See FIG. 12.

Figure 7:
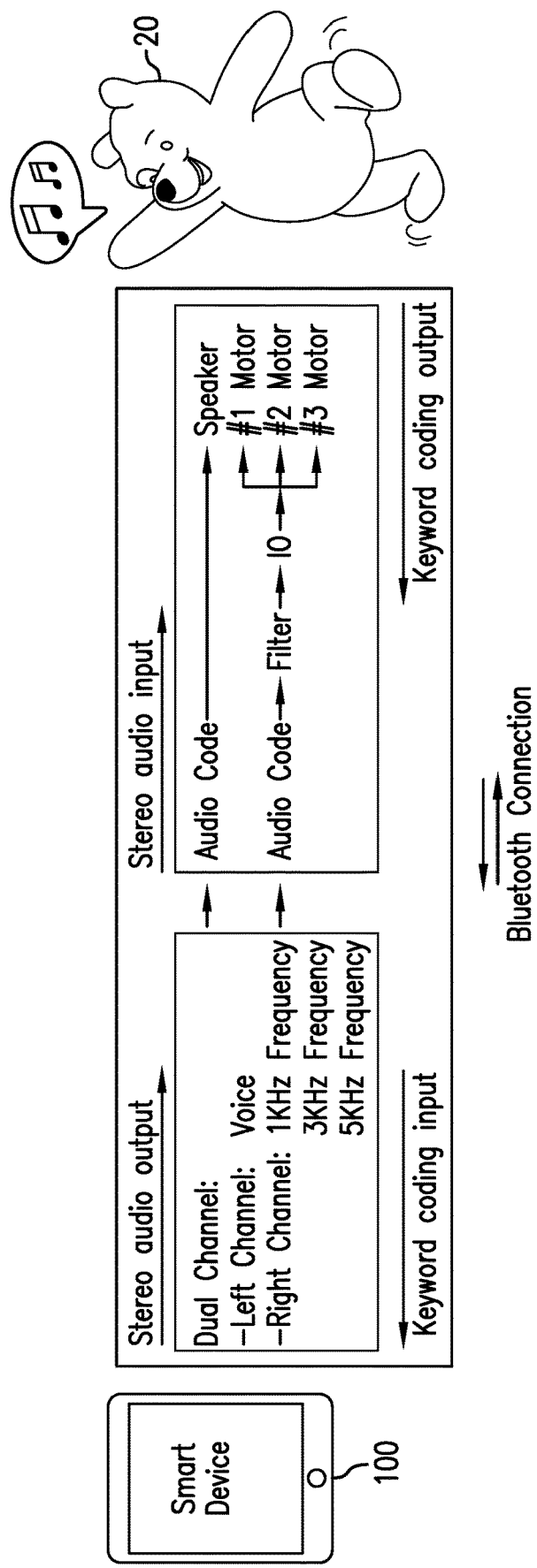
FIG. 7 is a schematic illustrating the basic principles of two-way communication implemented by the system of FIG. 6.

Specifically, referring to FIGS. 6 and 7, the smart device 100 outputs the stereo audio to the transceiver 42 of the module 122. The transmission from the smart device 100 to the transceiver 42 can be through known Bluetooth™ protocols such as A2DP, HFP, HSP and OBEX, although any appropriate Bluetooth™ protocol can also be used. The stereo audio is transmitted via two channels, a left channel and a right channel. The left and right channels provide the voice signal that is provided to the audio code module 62 and then output the audio current from the left channel to the audio amplifying circuit 70, and then on to the speaker 32. The right channel is a high frequency signal, such as 1 kHz/3 kHz/5 kHz, that is provided to the audio code module 62 and then to the isolating filtering circuit 64, where it is output as a high level or low level to the IO module 58, where the IO module 58 will output the signal to the motor drive circuit 66 to control the three-channel motor 88.

For example, when the smart device 100 outputs 1 kHz of high frequency to the right channel, the isolating filtering circuit 64 will output a high level to the IO module 58, where it then outputs the signal to the motor drive circuit 66 to drive the #1 motor 88 of FIG. 4A to rotate. When the isolating filtering circuit 64 receives 3 kHz of high frequency from the right channel, the IO module 58 would output a high level to the motor drive circuit 66 to drive the #2 motor 88 of FIG. 4B to rotate. Similarly, when the isolating filtering circuit 64 receives the 0 kHz of high frequency from the right channel, the IO module 58 would output a low level to the motor drive circuit 66, so that none of the motors would rotate.

At the same time, the Bluetooth™ module 122 can communicate with the smart device 100 via a keyword coding output. Keyword coding represents operating commands, such as a keyboard command keys. When the smart device 100 receives the operating commands from the object 20, the smart device 100 will reflect the relative action of the App. For example, when the smart device 100 is streaming a story to a doll 20, the user can press a switch or button on the left foot of the doll 20, which would cause the doll 20 to send operating commands to the smart device 100 to change the storytelling mode to a song mode, so that the smart device 100 will start streaming a song to the doll 20. When the user presses the left foot of the doll 20 again, the smart device 100 will stop the streaming of the song, and at this time if the user presses the left foot of the doll 20 again, the smart device 100 will re-start streaming the song to the doll 20.

This two-way transmission of stereo audio from the smart device 100 to the module 122, and keyword coding output from the module 122 to the smart device 100, allows the present invention to achieve a desirable "Two-Way Communication" system using Bluetooth™.

Figure 8:
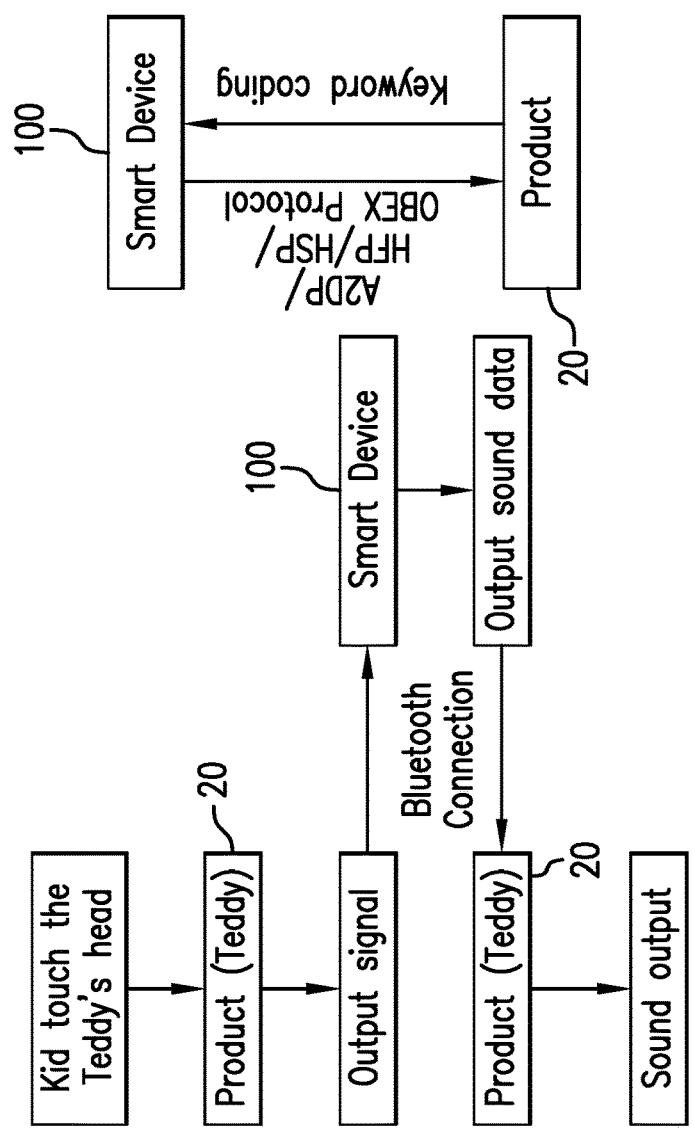
FIGS. 8 and 9 illustrate examples of two-way communication implemented by the system of FIG. 6.
Figure 8:
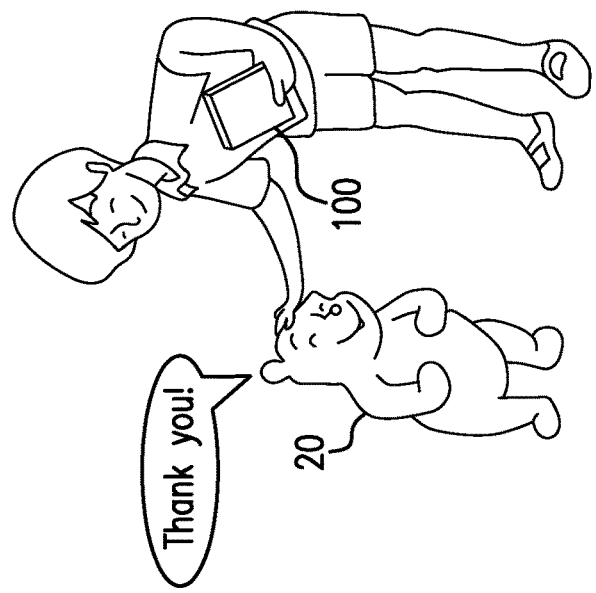

The operation for the Two-Way Communication according to the present invention is described in connection with FIGS. 8-10, where the object 20 is an "intelligent" teddy bear. As shown in FIG. 8, a child is holding a smart device 100 and walking along a path with the teddy bear 20. The two-way communication between the smart device 100 and the teddy bear 20 would facilitate any of the following activities.

For example, during the walk, the teddy bear 20 could be singing along with the child as a companion. As the child touches the teddy bear 20, the sensor 24 detects the touch and the teddy bear 20 would respond to the child; for example, the teddy bear 20 would look up and say "thank you" to the child for his care. FIG. 8 shows a flowchart illustrating how the teddy bear 20 outputs a signal to the smart device 100, which then outputs sound data back to the teddy bear 20 (all through Bluetooth™ protocols), where the teddy bear 20 responds with the "thank you". The platform being used is either Bluetooth™ or a Wi-Fi platform (see FIG. 10 below) where commands such as voice and sound are transmitted through the smart device 100 to the object 20 (teddy bear). The object acts as a speaker that enables a lively interaction that is made possible through the connected waves in either Bluetooth™ or Wi-Fi.

Similarly, the teddy bear 20 could follow a certain walking/driving distance (footsteps) behind the child, and as such, would be similar to using the smart device 100 as a controller to direct the sequence of operation. Another methodology is for the smart device 100 to send a command signal or instruction to the teddy bear 20, instructing it to follow the smart device 100 at a certain distance. For example, for every step that the child walks, the teddy bear 20 has to be following within 1 to 2 meters range.

In this regard, both voice commands and directive commands (walking/driving command) can be transmitted through the smart device 100 to the teddy bear 20, so that the teddy bear 20 would be walking, singing and speaking to the child as an interactive product.

For the smart device 100 to create this interaction (while pairing with the previously-described voice and directive commands together) is very challenging because it is not just an interaction (i.e., a command system) sent through the smart device 100 to the object 20, but it also requires an the interaction sent back from the object 20 to the smart device 100. Consider the currently-known haptic technology, which is designed for the gaming and medical industries. In the gaming sector, the PS3 controller (product) sends commands to the device (PS3 station connected to the TV), and the screen of TV would display different graphical and character changes. This is a type of one-way communication (i.e., controller to the device). When the subject (i.e., the character that is controlled by the person with the controller) is hit in the game, the PS3 sends a signal back to the controller, creating an interactive command for a vibration so that the person holding the controller realizes that the subject in the game has been hit (without even looking at the screen). These interactions (product to device, and then device to product) working concurrently are examples of the "two-way communication" of the present invention.

Unfortunately, haptic technology is limited to only a specific number of command systems. Haptic technology can interact both ways in sending directive commands, but it cannot send the voice/sound commands of the present invention because these voice/sound commands require a higher bandwidth if a two-way communication methodology is applied concurrently. With this limitation, the teddy bear 20 would appear to be less lively and interactive.

Figure 9:
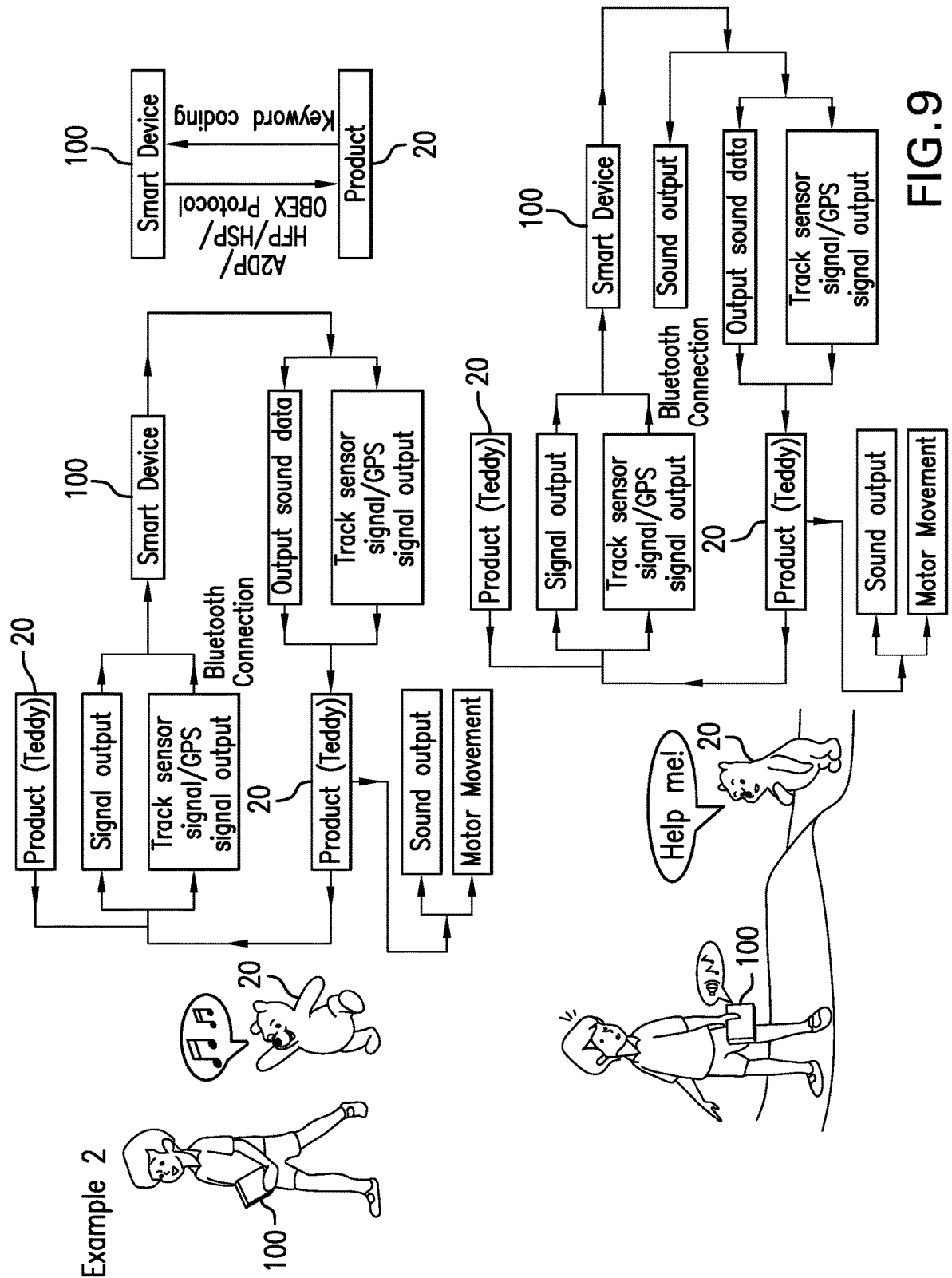

FIG. 9 illustrates another type of operation that can be achieved using the two-way communication of the present invention. Here, the teddy bear 20 has been walking and singing to the child during their walk, with the teddy bear's location and movements monitored by GPS or similar tracking means. The command system is sent through the smart device 100 to the teddy bear 20 as a one-way communication platform. Suddenly, a wind blows that is strong enough to cause the teddy bear 20 to fall on the floor so that the teddy bear 20 can no longer move. While the teddy bear 20 continues to sing, and with its legs moving, sends a signal to the smart device 100 indicating that it has fallen on the ground and can no longer move, leveraging on the two-way communication platform. The smart device 100 receives the signal from the teddy bear 20, and then stops sending the singing and leg motion commands to the teddy bear 20, and also determines that the teddy bear 20 has fallen such that a rescue operation is now needed. The smart device 100 sends a signal back to the teddy bear 100 after receiving the command from the teddy bear 20 that it has fallen, causing the teddy bear 20 to call out for help. The child hears this rescue call, and runs to pick up the teddy bear 20, and it starts walking again.

Thus, the present invention provides a two-way communication platform that is not limited to just directive commands (object 20 to smart device 100, and smart device 100 back to object 20), but also includes the voice commands that allow for the creation of a whole new user experience.

The two-way communication platform of the present invention can be used by adopting the newest technology such as Bluetooth 2.1, 4.0, 4.1, or even with Wi-Fi, by pairing the commands such as, and not limited to, keyboard wireless commands. The interaction, while receiving voice/sound commanding data, can send keyword commands, for example, sd2 or rk5, to represent the interactive feedback.

Wi-Fi Mode

Figure 10:
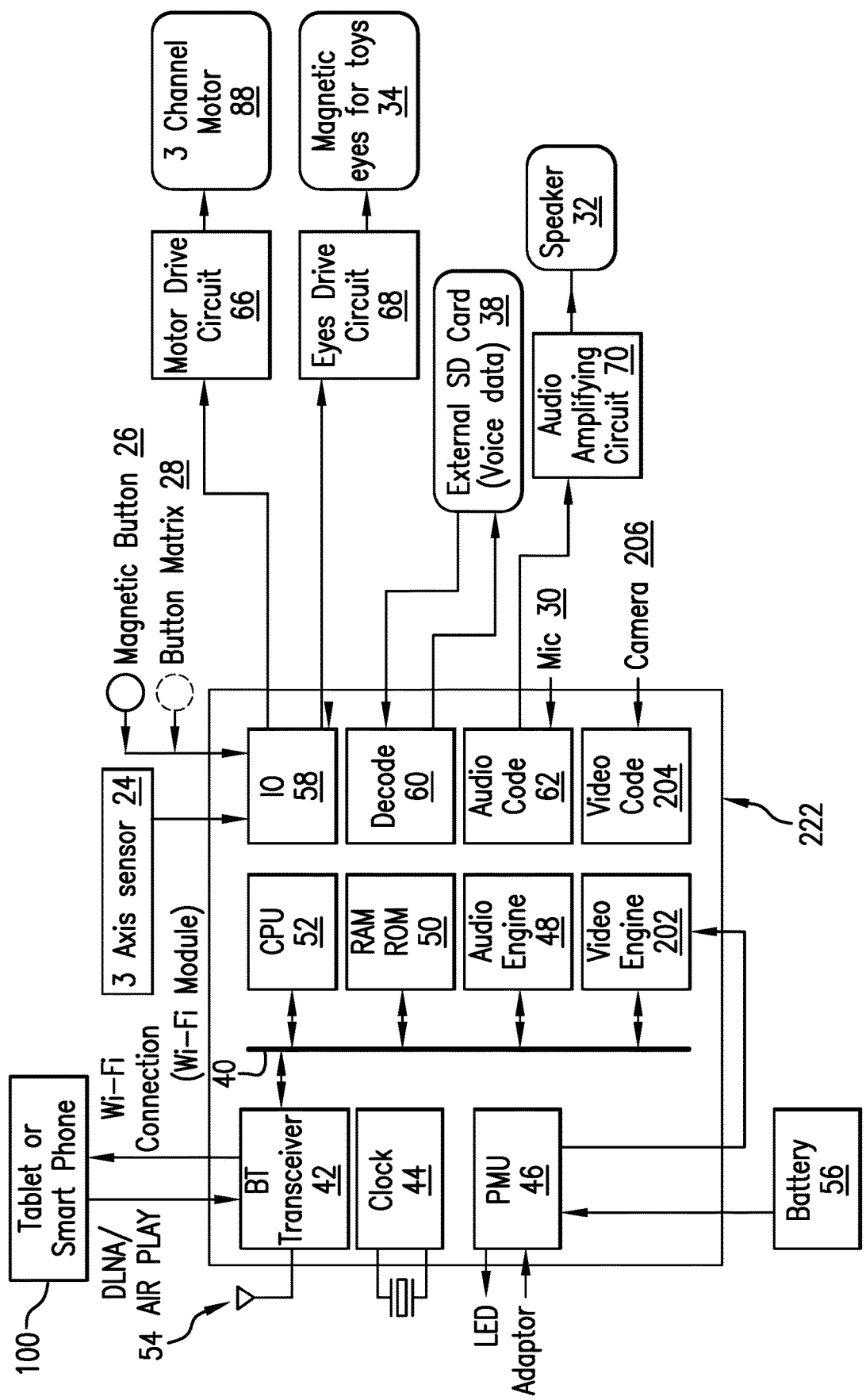
FIG. 10 is a block diagram illustrating yet another system according to the present invention.

FIG. 10 illustrates a third embodiment of the present invention where the object 20 shown and described above communicates with a smart device 100 in Wi-Fi mode. All the components and related operations shown in FIG. 10 are identical to the components and operations shown in FIG. 6, except that FIG. 10 now shows the smart device 100 communicating with the transceiver 42 via Wi-Fi. The communications module 22 is now a Wi-Fi module 222. In addition, there are two changes when compared with FIG. 6.

First, a video engine 202 is coupled to the bus 40 and the PMU 46, and the Wi-Fi module 222 also includes a video code module 204 that is coupled to a camera 206 which can be integrated with the object 20. The camera 206 captures images and sends the images to the video code module 204 for processing by the video code module 204 and the video engine 202. These images can then be transmitted via the transceiver 42 to the smart device 100 and displayed on the smart device 100.

Second, the isolating filtering circuit 64 from FIG. 6 is omitted as being unnecessary because the Wi-Fi module 222 can transmit or receive stereo audio and operating commands at the same time.

The following examples illustrate various ways in which the present invention can function and operate.

Example 1

When a user (e.g., the child in FIGS. 8-9) speaks to the smart device 100 through the microphone of the smart device 100, the user's voice can be played back from the object 20. Specifically, the user's voice can be transmitted to the communication module 22, Bluetooth™ module 122 or Wi-Fi module 222, which subsequently sends the voice signals to the speaker 32 to be broadcast at the speaker 32.

In addition, the voice will trigger movement of portions of the object 20. For example, if the object 20 is the teddy bear in FIGS. 8-9, then the teddy bear's eyes 34 will wink, and its limbs can move. Specifically, the user's voice can be transmitted to the communication module 22, Bluetooth™ module 122 or Wi-Fi module 222, which subsequently processes the voice signal to provide operational signals to the motor drive circuit 66 and the eye drive circuit 68 to cause the eyes 34 and the body parts to move.

Example 2

When a user (e.g., the child in FIGS. 8-9) speaks directly to the object 20, the user's voice can be transmitted back to the smart device 100 and broadcast at the smart device 100. An application (APP) may need to be installed at the smart device 100 to facilitate such a playback. Specifically, the user's voice is received by the microphone 30 at the object 20, and transmitted to the communication module 22, Bluetooth™ module 122 or Wi-Fi module 222, which subsequently sends the voice signals to the transceiver 42 to be transmitted to the smart device 100.

In addition, the voice signals that are transmitted to the smart device 100 can also be used to trigger other functions or activities. For example, the user can say "read me a story" to the microphone 30 at the object 20, and this command or instruction is transmitted to the smart device 100, where the APP on the smart device 100 causes a story that is stored on the smart device 100 to be read out from the speaker at the smart device 100.

Example 3

Figure 11:
FIG. 11 illustrates an example of an extended communication link involving multiple objects and smart devices.

Referring now to FIG. 11, as a further extension of Example 2, the voice signals from the object 20a can be transmitted to the smart device 100a, where the APP can communicate the voice signals to a different second smart device 100b using a mobile, Bluetooth™ or Wi-Fi link, with the second smart device 100b processing the voice signals to cause an activity to occur at the second smart device 100b, or to transmit the voice signals to a different second object 20b. FIG. 11 illustrates this communication link. For example, a child can use the object 20a and the first smart device 100a to carry on a two-way conversation with another person who is using the second object 20b and the second smart device 100b.

Another variation of the communication link shown in FIG. 11 is where a child can use the object 20a and the first smart device 100b to communicate with someone at a remote location (even without the second object 20b). Specifically, the voice signals from the first object 20a can be communicated via the first smart device 100a to a second smart device 100b that is located at a remote location. For example, a child in Los Angeles with the first object 20a and the first smart device 100a can carry on a conversation with his or her father over a mobile link, where the father is talking on a smart phone 100b in New York.

Example 4

As a further extension of Example 2, the object 20 can be used like a smart phone for the child. If the smart device 100 is a smart phone, any incoming calls received by the smart device 100 will cause a ring tone to be played on the speaker 32 of the object 20. The child can answer the call by pressing on one of the buttons 26 or 28, and then carry on a conversation using the microphone 30. The voice signals are relayed back and forth through the smart device 100 and a mobile link to a remote caller.

Example 5

Figure 13:
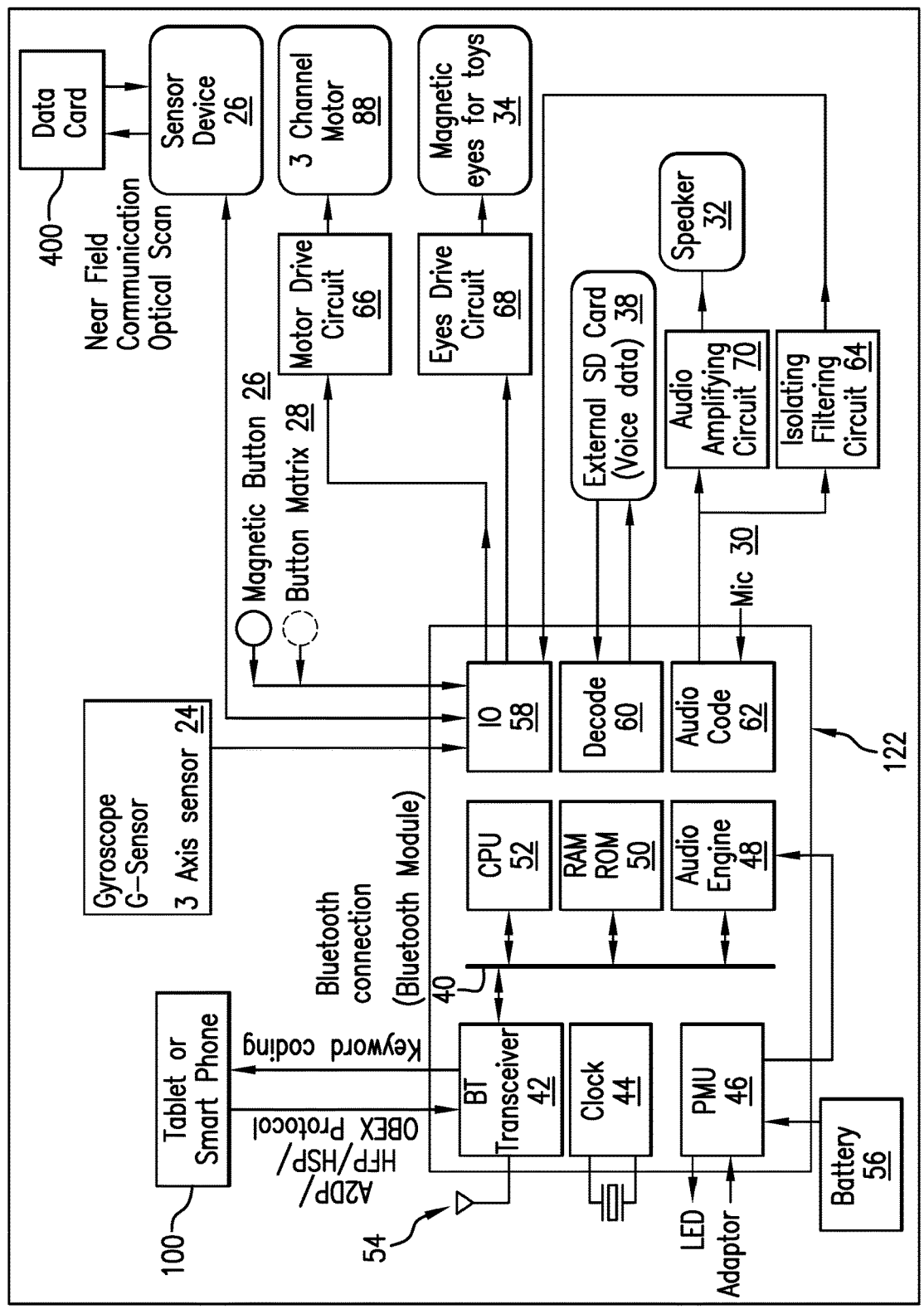
FIG. 13 is a block diagram illustrating another system according to the present invention.
Figure 14:
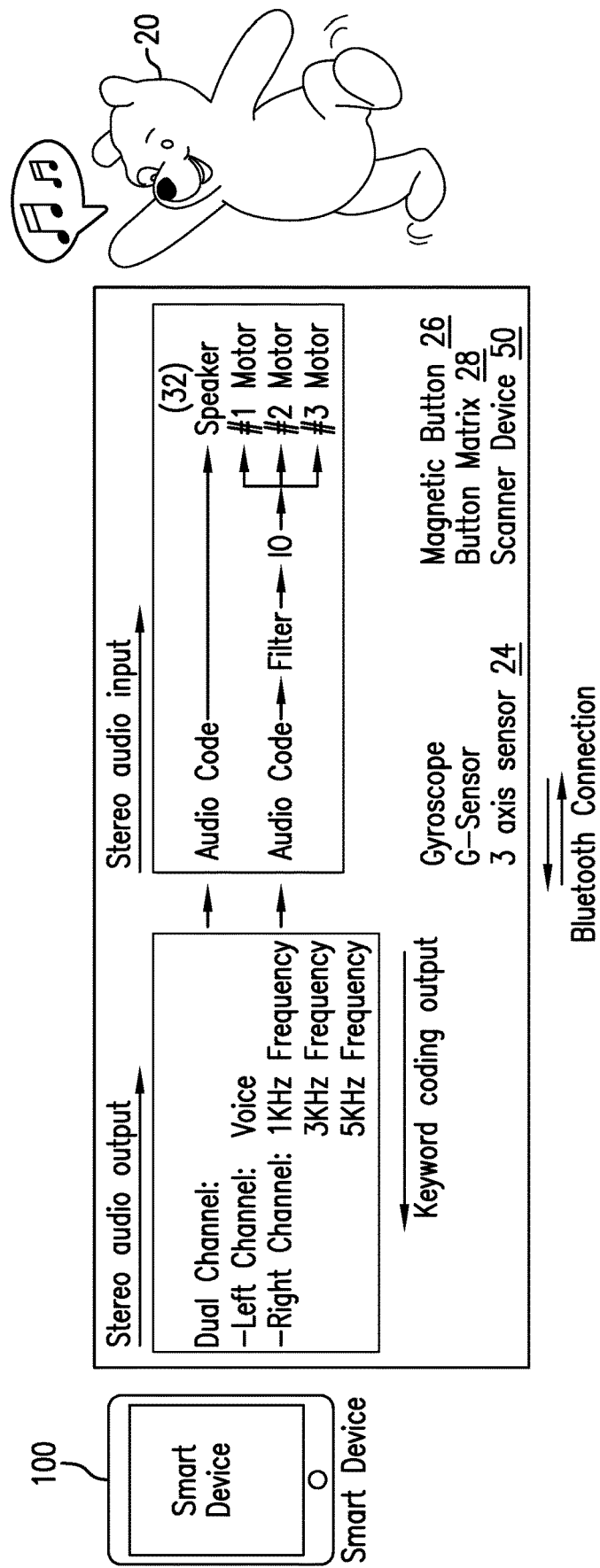
FIG. 14 is a schematic illustrating the basic principles of two-way communication implemented by the system of FIG. 13.

Referring to FIGS. 13 and 14, the object 20 can be provided with a scanner 90 that scans a data card 400. FIGS.

13 and 14 are the same as FIGS. 6 and 7 except that the scanner 90 and the data card 400 have been added, and the 3-axis sensor 24 now includes a gyroscope. Otherwise, all the other elements in FIGS. 13 and 14 are the same as in FIGS. 6 and 7.

More specifically, an NFC (near field communication) scanner 90 can be coupled to the IO module 58, and be used to scan data from a data card 400 that is held close to the scanner 90. As embodied with the teddy bear 20 described herein, the scanner 90 can be embedded internally in the Bluetooth™ module 122, and located at about the stomach area of the teddy bear, or it can be located externally from the teddy bear and connected through USB or related connectors. A child can hold a data card 400 adjacent the stomach of the teddy bear or the external scanner 90 so that the scanner 90 can scan the data card 400. The data card 400 can even be embodied in the form of another accessory object. For example, an object shaped as an apple could have a data card 400 provided therein containing information about the apple.

The scanner 90 allows the system to increase the play pattern with the two way communication. When the object (e.g., toy or teddy bear) is connected via Bluetooth, Wifi or other wireless channels to the smart device 100, the scanner 90 scans the data card 400 in the accessory object and sends the data to the smart device 100 via the Bluetooth™ module 122. The data can include information about an apple, or songs or stories about apples. The smart device 100 reads the data and displays graphics (e.g., of an apple) of the accessory object on the screen while sending sound data back to the teddy bear where a song or story can be played. For example, the child will see the image of an apple on the screen of the smart device 100 while the teddy bear starts describing the advantages of eating an apple through the two way communication technology.

The play pattern described herein can also be done without the smart device 100, by using an SD card or related memory cards stored inside the teddy bear (object 20). The scanner 90 scans the data of the data card 400, and then sends the data to the SD card to denote the information of the data card 400. The teddy bear can then gather the information from the SD card and then process it by outputting a story or a song. In this embodiment, no wireless, Bluetooth™ or Wifi capability is needed because the teddy bear (object 20) can have the scanner 90, a speaker 32 and a memory card (e.g., SD card) all connected to one single module (e.g., 122) inside the object 20.

Example 6

Figure 15:
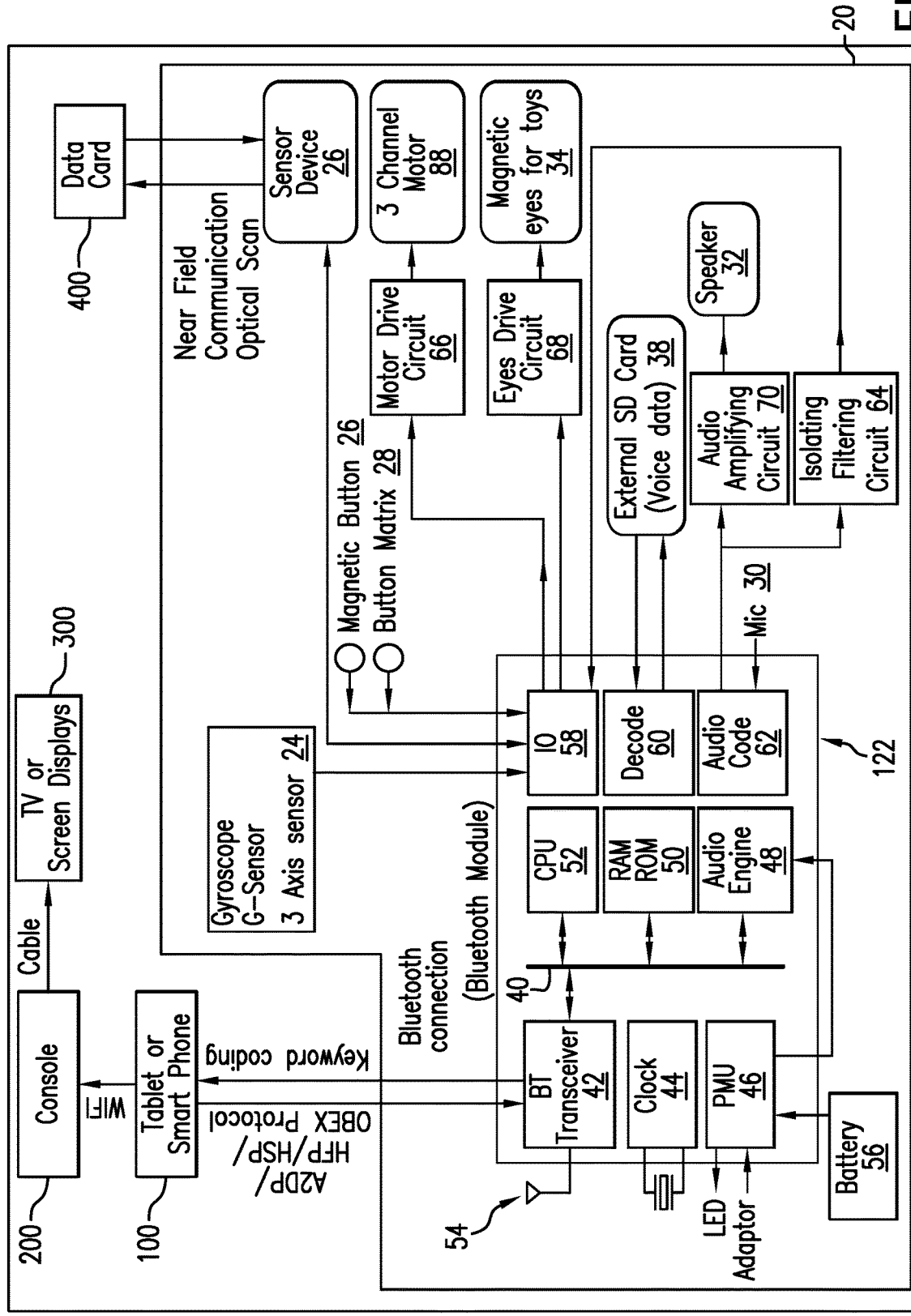
FIG. 15 is a block diagram illustrating yet another system according to the present invention.
Figure 16:
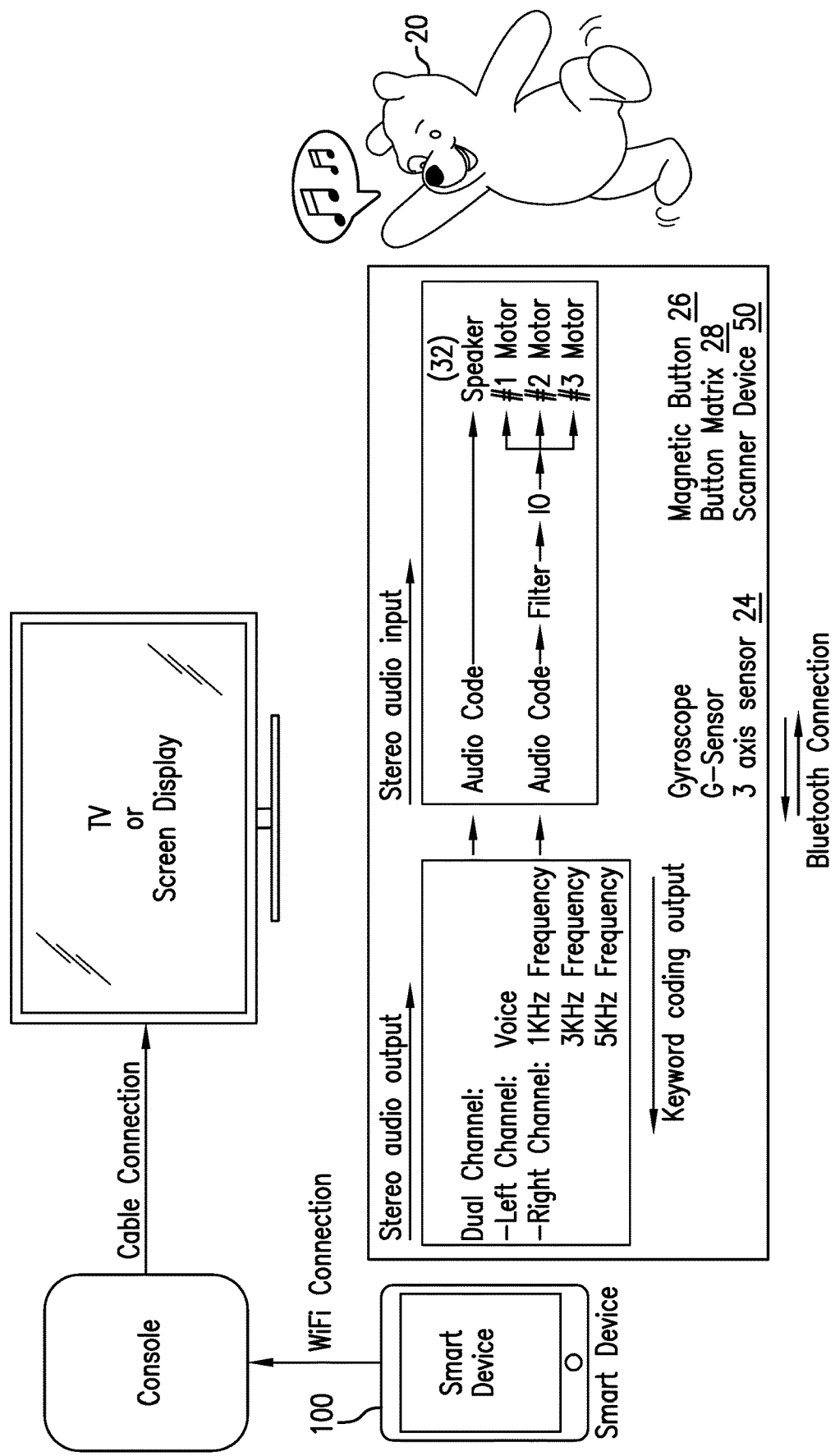
FIG. 16 is a schematic illustrating the basic principles of two-way communication implemented by the system of FIG. 15.

Referring to FIGS. 15 and 16, the embodiment shown in FIGS. 13 and 14 can be further modified to include the use of a television or screen display 300 via a console 200. FIGS. 15 and 16 are the same as FIGS. 13 and 14, respectively, except that the console 200 and the screen display 300 have been added. Otherwise, all the other elements in FIGS. 15 and 16 are the same as in FIGS. 13 and 14.

In this embodiment, the child holds the teddy bear (toy 20) in the hand and starts navigating a selected App on the smart device 100. The child does not need to touch the screen of the smart device 100 or the display 300 in order to play with the App or related software. The toy 20 is connected via Bluetooth™, Wifi or other wireless channel means to interact with the smart device 10, which can in turn be coupled (e.g., via a Wifi connection) to the console 200 for further interaction and play. The child can view the play or interaction on the display 300. For example, the images of the App can be shown on the display 300. The advantage of this type of two-way communication is that it allows the child to play with the App or related software without touching any screen in order to navigate or interact. Where the display 300 displays the image of the App or related software, the child is unable to touch the TV screen to swipe or make selection anyway. Instead, the child is enabled to select or navigate by touching a component of the toy 20, such as the paws of the teddy bear. In this embodiment, the smart device 100 functions as a conduit through which the child (through the toy 20) can control images being displayed on the display 300.

Example 7

As a further extension of Example 6, the image of the toy 20 (e.g., teddy bear) can be shown on the screen display 300 during the interactive play pattern, thereby increasing the play value and variety of the two-way communication under the present invention. The accelerator or related technology (e.g., sensor 24) that is embedded internally or externally (e.g., through external connector) to the toy 20 can function to evaluate the position or orientation of the toy 20. The screen display 300, which is connected via Bluetooth™, Wifi or other wireless channels, displays an image of the toy 20. As an example, the child can be engaged in a running race with the teddy bear where the child has to hold the teddy bear physically on the hand (e.g., where the sensor 24 might be positioned) to play with the teddy bear. The display 300 would then show a digital teddy bear running a race to go left or right, with the child in the real physical world having to hold the hand of the teddy bear and making a corresponding movement to go either left or right. Any movement that the child makes with the toy will result in the image of the teddy bear on the display 300 reacting accordingly. This can be accomplished by having the toy 20 send a signal to the screen display 300 via the smart device 100 and the console 200, so that the display 300 will show how the teddy bear moves in the digital world. If the teddy bear hits a road block on the display 300, then the display screen 300 will send a signal back to the teddy bear (toy 20), and the toy 20 (teddy bear) might emit via its speaker 32 a statement such as "Ouch" or "I am hurt". In other words, the actual toy 20 sends a signal to create a play experience on the display 300, and the display 300 having received the data or signal from the toy 20 would make changes accordingly. In response, any motion or event that image of the teddy bear on the display 300 experiences can cause a signal (e.g., voice data or motion signal) to be sent back to the actual toy 20 to trigger a voice or motion response by the toy 20.

Example 8

Figure 17:
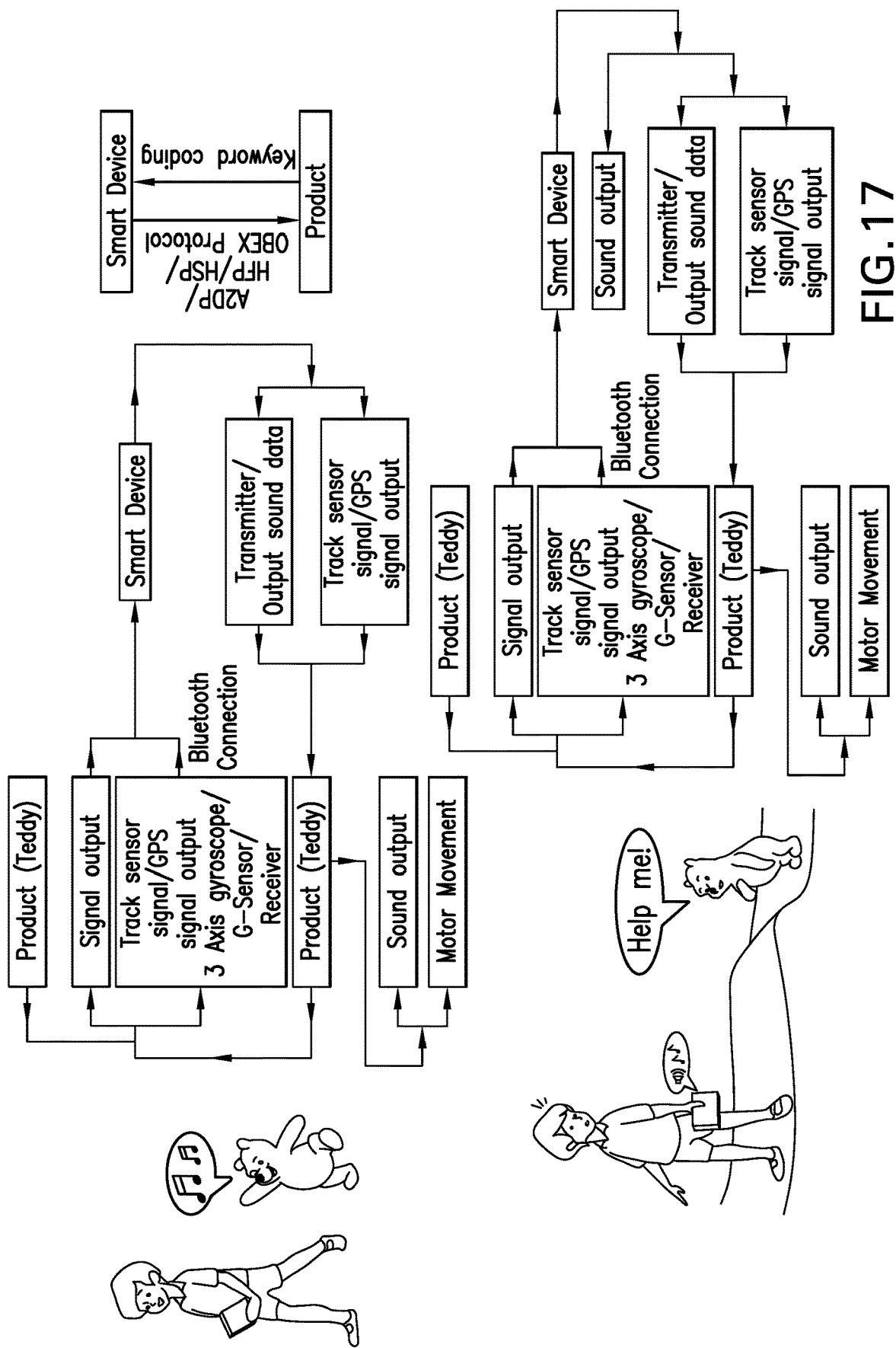
FIG. 17 illustrates a modification to the system and example of FIG. 9.

This Example follows from the play pattern illustrated in connection with FIG. 9, and is shown in FIG. 17. Here, the child has been controlling the teddy bear 20 to walk left or right by using the smart device 100 like an RC controller. The communication platform can be through Bluetooth™, Wifi or other wireless channels, as described above.

Now if the child gets tired in directing the teddy bear's actions, he can decides to turn the "play mode" into a "follow me" mode or other related modes, and puts the smart device 100 (e.g. a phone) into his pocket and starts walking home. Once the mode is switched to the "follow me" mode, the teddy bear 20 starts walking with the child without any direction or control by the child. The teddy bear 20, which is wirelessly connected with the smart device 100, recognizes its current position through the G-sensor or receiver 24, and with every move made by the smart device 100, whether it going forward or backward, or going left or right, the teddy bear 20 will follow the smart device 100. Thus, this play pattern is performed by following the smart device 100. Because the smart device 100 is placed into the child's pocket, the teddy bear 20 starts following the smart device 100, and it appears as if the teddy bear 20 is following the child without having the child to control the movement through manipulating the smart device 100. This is a one-way communication, with the smart device 100 sending motion signals to the teddy bear (toy 20).

A two-way communication can also be applied when the teddy bear 20 is following the child (actually following the smart device 100), and the teddy bear 20 suddenly falls down on the ground. A trigger is signaled to the teddy bear 20 and it sends signal back to the smart device 100, as described in connection with FIG. 9 above. The smart device 100 creates a response or vibration to the child, signaling that the teddy bear 20 has fallen down or needs help. This is a two-way communication where the toy 20 can send signals back to the smart device 100 while receiving a direction signal in return.

Thus, the present invention provides the following advantages: the Bluetooth™ module 122 can be employed to receive audio signals and to drive and control the motor 88, thereby enhancing the play variety and interest level of the object 20. In addition, the motor 88 is isolated from the speaker 34 so that the dual-functions of audio-driving the motor 88, and playing audio, can be accomplished simultaneously.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A method of providing an interactive communication between an object and a smart device, comprising:
   providing a smart device having a microphone, a speaker, a display and a transceiver;
   providing an object having at least one movable part, a motor coupled to the movable part, and a communications module that is operationally coupled to the speaker and the motor, the communications module having an object transceiver;
   actuating a "follow-me" mode, which includes the following steps:
      (i) providing location information from the transceiver of the smart device to the object transceiver of the object indicating the location of the smart device; and
      (ii) based on the location information received, the communications module transmitting signals to the motor to cause the motor to move the at least one movable part so that the object can move and have its movement follow the location of the smart device without further control by a user at the smart device; and
   communicating a notification signal from the object to the smart device when the object requires assistance.

2. The method of claim 1, wherein the object also has a speaker, and further including broadcasting a message from the object speaker indicative of the status of the object.

3. The method of claim 1, further including displaying images of the object at the display.

4. The method of claim 1, wherein the object further includes a speaker, the method further including:
   upon receipt of the notification signal, the smart device sends a signal to the object to cause the speaker at the object to broadcast a call for assistance.

* * * * *